United States Patent
Maurer

[11] 3,808,549
[45] Apr. 30, 1974

[54] OPTICAL WAVEGUIDE LIGHT SOURCE

[75] Inventor: Robert D. Maurer, Painted Post, N.Y.

[73] Assignee: Corning Glass Works, Corning, N.Y.

[22] Filed: Mar. 30, 1972

[21] Appl. No.: 239,743

[52] U.S. Cl. .......................... 331/94.5, 350/96 WG
[51] Int. Cl. .............................................. H01s 3/09
[58] Field of Search .............. 331/94.5; 350/96 WG

[56] References Cited
UNITED STATES PATENTS

| | | | |
|---|---|---|---|
| 3,753,145 | 8/1973 | Chesler | 331/94.5 |
| 3,571,737 | 3/1971 | Miller | 350/96 WG |
| 3,563,630 | 2/1971 | Anderson et al. | 350/96 WG |
| 3,350,654 | 10/1967 | Snitzer | 350/96 WG |

*Primary Examiner*—William L. Sikes
*Attorney, Agent, or Firm*—William J. Simmons, Jr.

[57] ABSTRACT

A source of optical wave energy for an optical transmission system. One end of an optical fiber having a thin, elongated core of laser material is so aligned with an end of an optical waveguide that coherent light generated in the core is coupled to the optical waveguide. A first transparent cladding layer is disposed upon the surface of the core, and a second thin transparent cladding layer is disposed upon the surface of the first layer. The refractive index of the first layer is less than that of the core and greater than that of the second layer. A solid state source of incoherent light is disposed immediately adjacent to that end of the optical fiber which is opposite the optical waveguide. Light from the solid state source is coupled into the optical fiber and is propagated longitudinally therethrough. Coherent light is generated by the core of laser material as it absorbs incoherent light propagating through the optical fiber.

14 Claims, 2 Drawing Figures

OPTICAL WAVEGUIDE LIGHT SOURCE

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

The transmitting media required in the transmission of frequencies around $10^{15}$ Hz are hereinafter referred to as "optical waveguides" which normally consist of an optical fiber having a transparent core surrounded by a layer of transparent cladding material having a refractive index lower than that of the core. It has been well known in the art that light can be propagated along a transparent fiber structure having a higher refractive index than its surroundings. Such optical fibers or light pipes are ordinarily grouped into a bundle which is utilized to transmit a light image. In such conventional optical fibers the ratio of the total diameter to the core diameter is almost unity, and the difference between refractive indices of the core and cladding material is made as large as possible. The total diameter to core diameter ratio of optical waveguide fibers is usually between about 10:1 and 300:1 for single-mode optical waveguides and is usually between about 1001:1000 and 10:1 for multimode optical waveguides, and the difference in indices of refraction is maintained small. This small difference between core and cladding refractive indices in optical waveguides results in an acceptance angle that is smaller than that of conventional optical fibers. Whereas the numerical aperture of commercial optical fibers or light pipes of the conventional type is usually between about 0.3–0.4, the numerical aperture of an optical waveguide is usually about 0.1. Moreover, the fact that a single optical waveguide can be utilized to transmit one or more signals necessitates the coupling of at least one discrete light beam into a single waveguide fiber. Although light waveguides of the type disclosed in copending patent application Ser. No. 36,267 filed by D. B. Keck et al. on May 11, 1970 are capable of propagating light over long distances with relatively low attenuation, suitable means must be provided for efficiently coupling an optical source to such waveguides before a practical optical communication system can be realized.

The light emission from an optical waveguide source must be highly directional in order to efficiently couple to the optical waveguide because of its low acceptance angle. Since only a very bright light source having the described characteristics can yield efficient coupling lasers have usually been considered for this role. Heretofore, light from conventional lasers of the type disclosed in U.S. Pat. No. 3,395,331 issued to E. Snitzer has been focused onto the core of an optical waveguide. However, it is highly desirable to utilize solid state sources rather than such conventional lasers since solid state lasers are more rugged, have a longer lifetime and are more compatible with solid state circuitry. Presently available solid state coherent light sources have a short lifetime and generally require cooling. For example, the semiconductor laser array disclosed in U.S. Pat. No. 3,590,248 issued to E. J. Chatterton, Jr. must be immersed in liquid nitrogen during operation.

SUMMARY OF THE INVENTION

It is therefore an object of the present invention to provide a solid state light source for launching optical signals in optical waveguides. Another object is to provide a compact, solid state fiber laser.

The present invention generally relates to a solid state source of optical wave energy which is adapted for use in an optical communication system. This source comprises an optical fiber having first and second ends and comprises a core of laser material having a relatively high refractive index, a first layer of light transmissive cladding material disposed upon the surface of the core and a second layer of light transmissive cladding material disposed upon the surface of the first layer, the first and second layers forming an internally reflective interface. The refractive index of the first layer is less than that of the core and is greater than that of the second layer. Solid state light source means is disposed adjacent ot the first end of the optical fiber for radiating incoherent light into the fiber. The fiber core absorbs incoherent light passing through the fiber and emits light by stimulated and spontaneous emission processes, the stimulated process yielding coherent light. If means are provided for supporting an end of an optical waveguide adjacent to the second end of the optical fiber, coherent light generated in the core will be coupled into the optical waveguide.

DESCRIPTION OF THE PREFERRED EMBODIMENT

Figure 1:
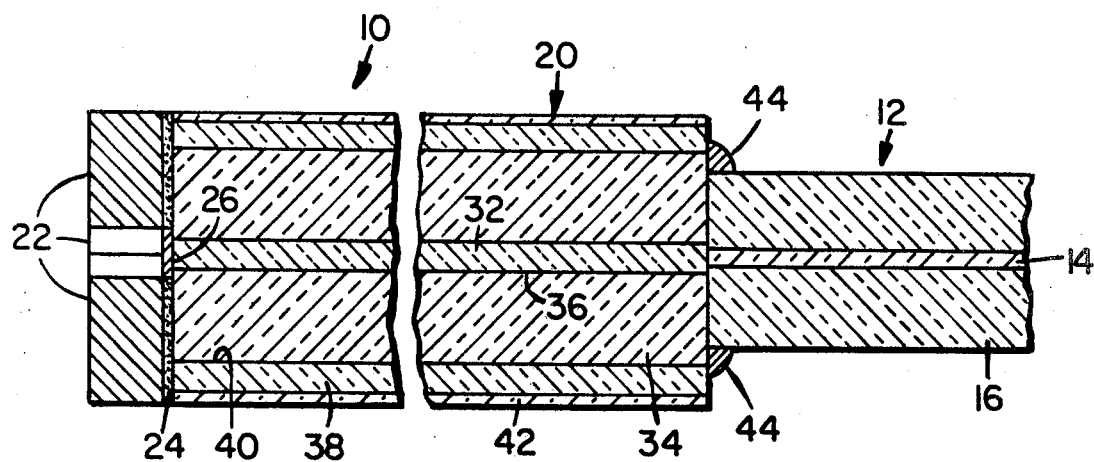
FIG. 1 is a cross-sectional view of a transmitting portion of an optical communications system embodying the optical wave energy source of the present invention.

FIG. 1 shows the transmitting portion of an optical communciation system including a source 10 of optical wave energy coupled to the input end of an optical waveguide 12 which consists of a core 14 of a transparent material having a given refractive index surrounded by a layer 16 of transparent cladding material having a relatively low refractive index. The diameter of core 14 may range from about the wavelength of light for single mode waveguides up to about 1,000 μm for multimode waveguides, the maximum diameter being limited by fiber stiffness. Multimode fibers generally employ cores having diameters less than 150 μm, and core diameters less than 25 μm are of current interest since the bandpass of a waveguide decreases as the core size and the number of propagated modes increases. Since multimode waveguides which propagate relatively few modes can carry much more information, such guides are usually preferred over those which propagate many thousands of modes.

Figure 2:
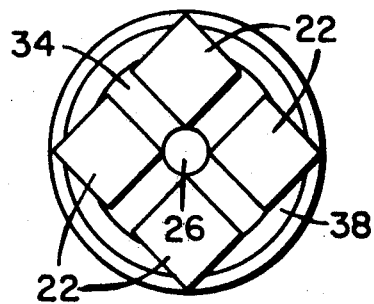
FIG. 2 is an end view of the device illustrated in FIG. 1.

Source 10 consists of a three-part optical fiber 20 and a solid state source of pumping light. The pumping source may consist of one or more solid state devices, capable of providing the proper wavelength of light for absorption by core 32. The embodiment illustrated in FIGS. 1 and 2 utilizes four light emitting diodes 22 which are adapted to be energized by current pulses from a suitable electrical source (not shown). Diodes 22 may be discrete devices that are attached to fiber 20 by a suitable light transmissive bonding material 24 such as an epoxy, or light emitting diodes could be deposited directly on the end of fiber 20 by well known thin film techniques. A thin light reflecting film 26 of silver, aluminum or the like is deposited in the central portion of the end of fiber 20 between diodes 22. If a single larger light emitting diode were utilized, film 26 could be deposited before the diode is attached to the fiber, or a diode having a hole through the center thereof could be utilized. In the latter case, film 26 could be deposited through the hole.

Fiber 20 consists of a thin, elongated, central fiber-like laser element or core 32, the length of which is appreciably greater than the transverse dimension thereof. Disposed in surrounding relationship with respect to the core 32 and in good optical contact therewith is a layer 34 of transparent cladding material having a refractive index which is lower than that of core 32. An interface 36 is disposed between core 32 and cladding layer 34. A second cladding layer 38 of lower refractive index than cladding layer 32 is disposed about cladding layer 34 and forms therewith an optical quality interface 40. A layer 42 of light absorbing material such as glass, plastic or the like may be disposed on the outer surface of layer 38 to prevent cross-talk between adjacent fibers when more than one device of the type illustrated is employed in a system in a side-by-side relationship. This elongated fiber structure may be formed in known fashion such as by inserting a polished rod of laser glass into a polished tube of inner cladding glass and inserting the resultant combination into a polished tube of suitable outer cladding glass. The assembly so formed may be heated and drawn down to a fiber of desired size in a manner well known in the fiber optic fabrication art. Light absorbing cladding layer 42 may be part of the fiber as drawn or may be applied after drawing by a method such as spraying, dipping or the like. After a fiber of desired dimensions is formed, both ends may be optically polished. One end is butted against fiber 12 in such a manner that cores 14 and 32 are substantially aligned. This alignment can be accomplished by observing the relative positions of the cores under a microscope and correcting for nonalignment by adjusting micromanipulators connected to fiber 20 and waveguide 12. This type of alignment is possible since cores 20 and 12 can be seen through their respective transparent claddings. A bead 44 of epoxy, glue, sealing or other bonding material may be applied to the junction of fibers 20 and 12 to maintain proper alignment.

The inner and outer cladding layers 34 and 38 may consist of any transparent materials having the proper indices of refraction to cause light from source 22 to be channeled longitudinally along fiber 20, providing layer 34 is compatible with layer 38 and core 32. The refractive index of cladding 38 must be sufficiently lower than that of cladding 34 so that an appreciable amount of light emitted by diodes 22 is accepted by fiber 20, undergoes total internal reflection at interface 40, and is thereby propagated along fiber 20. Such a structure is necessary because the active core 32 comprises such a small portion of the fiber volume that it does not absorb much pumping light on a single pass of a beam of pumping light therethrough, and the pumping light must therefore be reflected back and forth many times from interface 40 before most of it is absorbed by core 32. Since the refractive index of core 32 is higher than that of layer 34, pumping light impinging on interface 36 readily enters the core. Obviously, the pumping light losses in cladding 34 must be very low, and the materials used for layers 34 and 38 should be highly transmissive at the pumping source wavelength. Moreover, absorption losses for the laser light generated in core 32 should be low in both the core 32 and cladding 34 since the guided wave is propagated in and around core 32. The length of fiber 20 should be great enough to permit most of the pumping light generated by diodes 22 to be absorbed by core 32, and the diameter of layer 34 should be great enough that most of the pumping light emitted by the solid state pumping source or sources is coupled into fiber 20. The thickness of layer 38 should be great enough to prevent the evanescent wave resulting from pumping light reflections at interface 40 from reaching the outer surface of layer 38. A thickness of 20 $\mu$m has been found to be sufficient.

Although the drawing indicates that core 32 is slightly larger in diameter than core 14 of optical waveguide 12, the diameter of core 32 could be equal to or less than that of core 14. The diameter of core 32 and the relative refractive indices of core 32 and cladding layer 34 are preferably chosen so that the energy distribution of the guided wave of laser light proceeding down fiber 20 approximates the energy distribution of the mode or modes of light propagation in optical waveguide 12. The coupling efficiency between fiber 20 and optical waveguide 12 decreases when such parameters as diameter of core 32 and refractive indices of core 32 and cladding 26 depart from optimum values.

Cladding layer 38 may consist of a borosilicate glass, and cladding layer 34 may consist of a lead optical glass. Specific compositions which may be utilized for these two layers are as follows. Layer 38 may comprise 69.35 weight percent $SiO_2$, 3.0 weight percent $Al_2O_3$, 18.0 weight percent $B_2O_3$, 8.25 weight percent $K_2O$, 0.5 weight percent $Na_2O$ and 0.75 weight percent $Li_2O$. Layer 34 may comprise 45.60 weight percent $SiO_2$, 45.42 weight percent $PbO$, 5.10 weight percent $K_2O$, 3.48 weight percent $Na_2O$ and 0.40 weight percent $As_2O_3$.

Core 32 may comprise a fiber of neodymium containing glass which is capable of emitting 1.06 $\mu$m wavelength light when pumped with light having a wavelength of about 8,000A. The base glass, to which neodymium oxide may be added, may be the same glass utilized for layer 34. The neodymium oxide increases the refractive index of the base glass as well as giving lasing properties thereto. Other rare earths such as holmium and ytterbium have also been used as dopants in laser glasses. Various examples of suitable laser materials, host materials and their lasing wavelengths are given in the publication "Glass Lasers" by E. Snitzer, *Proceedings of the Institute of Electrical and Electronic Engineers*, pages 1,249–1,261, Oct. 1966. The term "laser material" as used herein is not intended to limit the invention to any particular material. The present invention may use any solid state material capable of producing radiation by stimulated emission and capable of being formed into the thin, elongated fiber-like core 32. Gallium-aluminum-arsenide diodes can be utilized to provide the aforementioned pumping wavelength of about 8,000A when neodymium is utilized as the active laser material.

I claim:

1. In an optical communication device including an optical waveguide having a core of transparent material and a layer of transparent cladding material disposed upon the surface of said core, a source of optical wave energy comprising an optical fiber having first and second ends,
        said fiber comprising
            an elongated core of transparent dielectric material which includes an active laser material that is capable of absorbing incoherent light of at least one wavelength and emitting light of at least another wavelength,
            a first layer of transparent cladding material dispoed upon the surface of said core, said first layer having a refractive index less than that of said core, and
            a second layer of transparent cladding material disposed upon the surface of said first layer, said second layer having a refractive index less than that of said first layer and forming with said first layer an internally reflective interface,
    pumping means disposed adjacent to said first end of said optical fiber for radiating into said fiber incoherent light of said at least one wavelength, at least a portion of said incoherent light propagating through said fiber by the process of total internal reflection from said interface, and
    means for supporting an end of said optical waveguide adjacent to said second end of said optical fiber so that the core of said optical fiber is substantially aligned with the core of said optical waveguide.

2. An optical communication device in accordance with claim 1 further comprising reflecting means disposed at said first end of said optical fiber adjacent to said core for reflecting said light of at least another wavelength generated in said core.

3. An optical communication device in accordance with claim 2 wherein said pumping means comprises a solid state light source.

4. An optical communication device in accordance with claim 3 wherein said solid state light source comprises a plurality of light emitting diodes.

5. An optical communication device in accordance with claim 4 wherein said reflecting means consists of a thin reflective film disposed on the central portion of said first end of said optical fiber.

6. An optical communciation device in accordance with claim 4 wherein said first layer consists of glass and said core comprises the same type of glass of which said first layer consists and a dopant material to give said core lasing properties and to increase the refractive index thereof.

7. An optical communication device in accordance with claim 6 wherein said dopant material is neodymium.

8. An optical communication device in accordance with claim 7 wherein said optical fiber further comprises a layer of light absorbing material disposed upon the surface of said second layer.

9. An optical communication device in accordance with claim 8 wherein said first and second ends of said optical fiber are polished.

10. A solid state fiber laser comprising
    an optical fiber having first and second ends,
        said optical fiber comprising
            an elongated core of transparent dielectric material which includes an active laser material that is capable of absorbing light of at least one wavelength and emitting light of at least another wavelength,
            a first layer of transparent cladding material disposed upon the surface of said core, said first layer having a refractive index less than that of said core, and
            a second layer of transparent cladding material disposed upon the surface of said first layer, said second layer being highly transmissive at said one wavelength and having a refractive index less than that of said first layer and forming with said first layer an internally reflective interface, and solid state means disposed adjacent to said first end of said optical fiber and in contact with a substantial portion of said first end along the face thereof for radiating through said end face into said fiber incoherent light of said at least one wavelength, at least a portion of said incoherent light propagating through said fiber by the process of total internal reflection from said interface.

11. A laser in accordance with claim 10 further comprising reflecting means disposed on said first end of said optical fiber adjacent to said core for reflecting said light of at least another wavelength generated in said core.

12. A laser in accordance with claim 10 wherein said solid state light source comprises a plurality of light emitting diodes.

13. A laser in accordance with claim 12 wherein said first layer consists of glass and said core comprises the same type of glass of which said first layer consists and a dopant material to give said core lasing properties and to increase the refractive index thereof.

14. A laser in accordance with claim 13 wherein said first and second ends of said optical fiber are polished.

* * * * *